United States Patent [19]
Aiken et al.

[11] Patent Number: 6,014,552
[45] Date of Patent: Jan. 11, 2000

[54] LOW PROFILE EJECT STYLUS

[75] Inventors: Christopher Aiken, Milwaukee, Wis.; Robert Stinauer, Arlington Heights, Ill.

[73] Assignee: Motorola, Inc., Schaumburg, Ill.

[21] Appl. No.: 08/816,649

[22] Filed: Mar. 13, 1997

[51] Int. Cl.⁷ ...................................................... H04B 1/38
[52] U.S. Cl. ............................ 455/90; 345/178; 345/179; 345/180
[58] Field of Search .............................. 455/90, 344, 347, 455/348, 349, 351, 575; 369/127, 170, 173; 345/173, 179, 180

[56] References Cited

U.S. PATENT DOCUMENTS

| | | | |
|---|---|---|---|
| 5,600,348 | 2/1997 | Bartholow et al. | 345/180 |
| 5,717,435 | 2/1998 | Fukushima et al. | 345/179 |
| 5,745,116 | 4/1998 | Pisutha-Arnond | 345/358 |
| 5,815,142 | 9/1998 | Allard et al. | 345/173 |
| 5,914,708 | 6/1999 | Lagrange et al. | 345/179 |

*Primary Examiner*—Wellington Chin
*Assistant Examiner*—Congvan Tran
*Attorney, Agent, or Firm*—Randall S. Vaas

[57] ABSTRACT

A low profile eject stylus (104) has an outer shell (402) and outer shell (404). The main shell is smaller than the outer shell whereby the main shell can slide within the outer shell. The outer shell has a cross sectional configuration such that it is larger in one direction (A) than it is in another direction (B) orthogonal to the one direction, such that the eject stylus has a low profile. A tip (406) fits within the main shell at an end opposite to the outer shell. The outer shell as assembled over at least a portion of a plunger (408). A spring (412) is coupled to the plunger to bias the stylus into a fully extended position. The stylus can be advantageously employed in a portable device (100) having a housing section (102) including an opening (103) for receipt of the stylus. Guide rails (302, 306) guide the stylus in the housing.

18 Claims, 4 Drawing Sheets

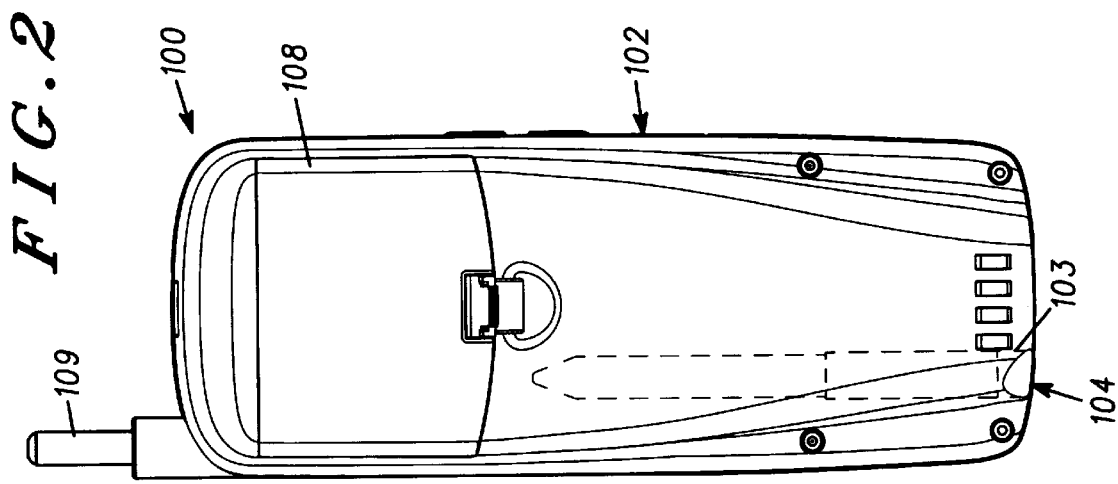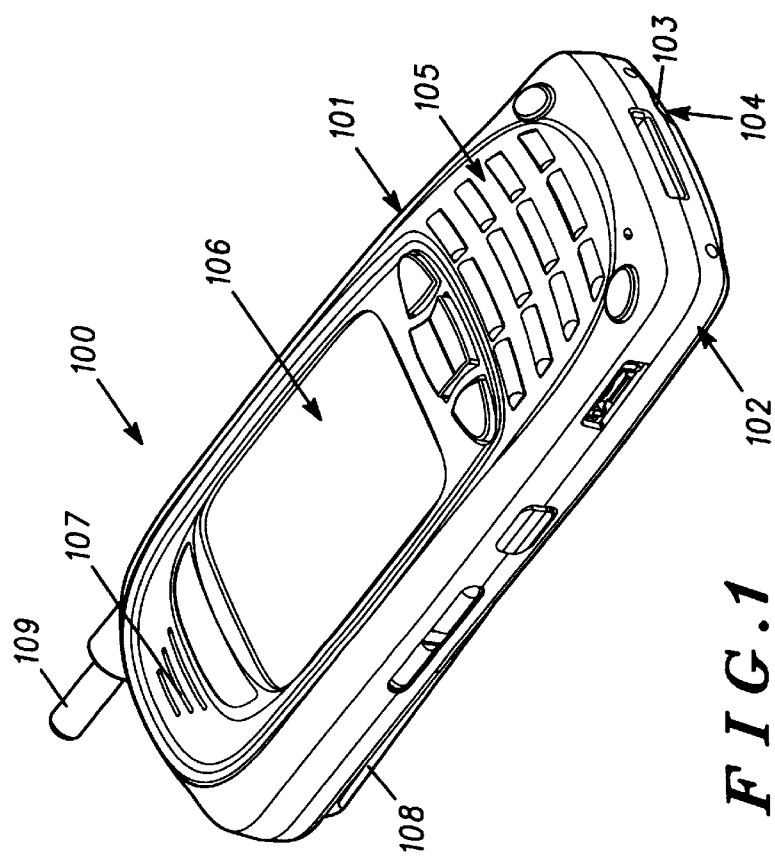

LOW PROFILE EJECT STYLUS

FIELD OF THE INVENTION

The present invention pertains to writing implements, and more particularly to telescoping styluses.

BACKGROUND OF THE INVENTION

A variety of devices are known that include a touch screen Examples of such devices include smart phones, personal digital assistants (PDA), pagers, personal organizers, and the like. These devices typically include a display module under the touch screen. The display module generates target images associated with menu options, programs, user choices, and other operations. The user controls the device by pressing the touch screen over the target image with a stylus or their finger. The device identifies the location pressed and executes the appropriate operation.

Users often employ a stylus to contact the touch screen for a variety of reasons. A stylus brings less dirt and oil into contact with the screen than a finger. A stylus often has a smaller point than a finger, such that it is a more accurate pointer to insure that the correct operation is initiated. For those devices that permit users to enter alpha-numeric characters by writing them, the stylus' point is necessary to achieve accurate character recognition.

Although a stylus is preferable to a finger for character entry via a touch screen, the stylus is less convenient to transport. It must be stowed in the device or the user must carry it. Users typically prefer to stow the stylus in the device so that it is not lost or forgotten when the device is transported. However, it is difficult to accommodate a stylus in a compact, portable device as it is often critical that these devices be light weight and compact.

For the stylus to be accommodated without comprising the size and weight requirements of the device, the stylus must also be light weight and compact. However, to provide a rigid stylus that is constructed of a single piece of plastic or wood, it is necessary that the stylus be thick. If the stylus is too thin, it will be flimsy and break easily. Additionally, a one piece stylus must have an element that projects out of the device in which it is stored so that a user can grip it to remove the stylus, or an ejection mechanism must be provided on the device to push the stylus out. Projecting elements are disadvantageous as they can get caught on clothes. Eject mechanism are undesirable because of their cost and space requirements.

One alternative to providing a stylus having a one piece construction is to employ a telescoping stylus. However known telescoping styluses require manual actuation to pull them to full extension. Additionally, although they permit storage in the retracted position, they are heavy and thick, requiring a large diameter opening in the device. Because of the large diameter, they necessarily require a relatively large storage volume even when retracted.

Accordingly, there is a need for an improved stylus for portable devices having a touch screen display.

BRIEF DESCRIPTION OF THE DRAWINGS

FIG. 1 shows a front, bottom, right side perspective view of a communication device having a touch screen and employing a stylus.

FIG. 2 is rear elevation view illustrating the communication device according to FIG. 1.

DETAILED DESCRIPTION OF THE DRAWINGS

Figure 3:
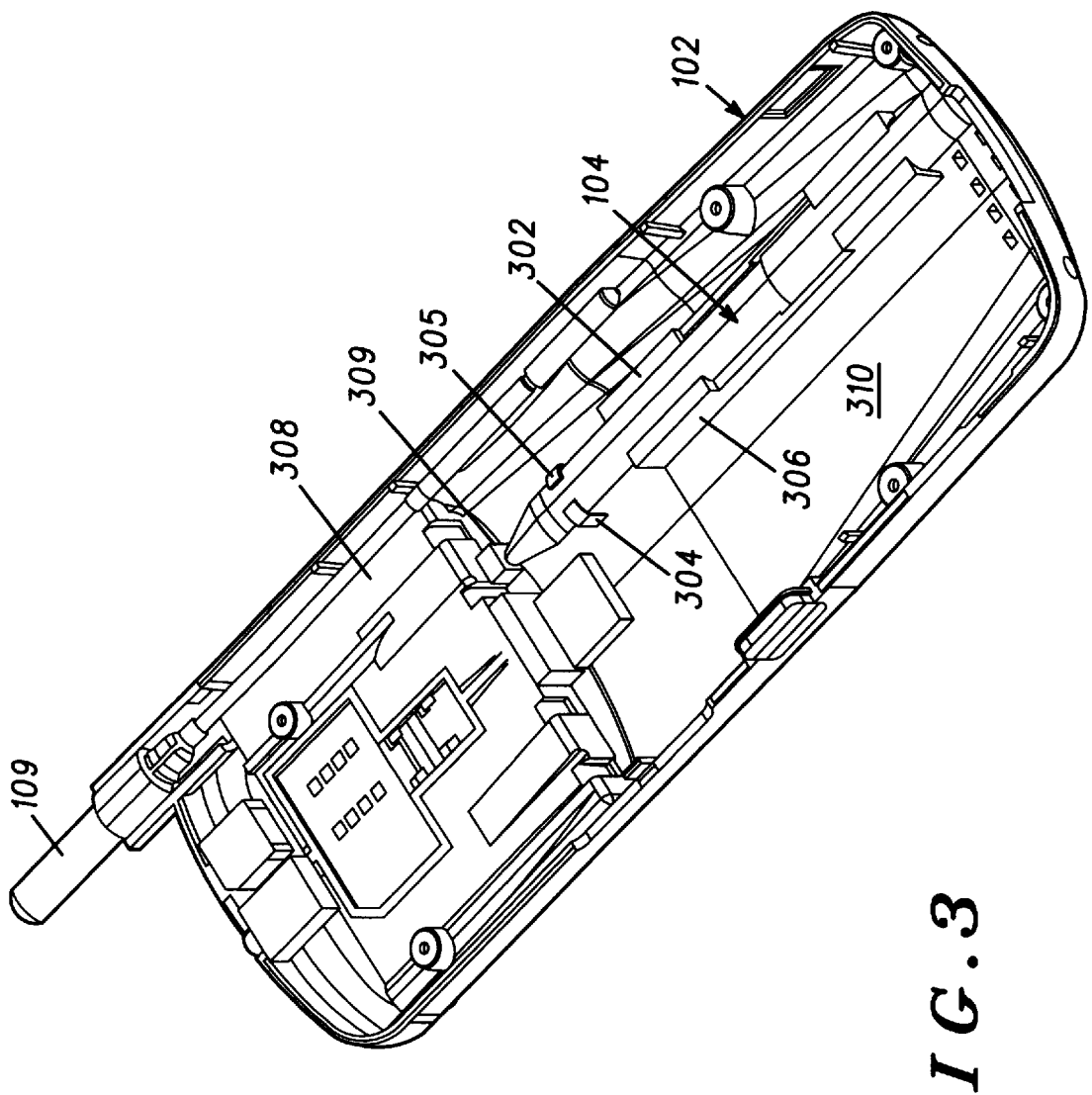
FIG. 3 is an internal view of a stylus stowed in back housing section of the communication device according to FIG. 1.

A portable device 100 (FIGS. 1 and 2), is illustrated to be a radiotelephone including a housing, comprising a front housing section 101 and a back housing section 102. A low profile eject stylus 104 is removably stored in the back housing section 102 and accessed via an opening 103. The stylus 104 can be used to contact a touch screen display assembly 106.

The portable device 100 is illustrated to be a cellular telephone and more particularly, a smart phone having a large touch screen display assembly 106. The display assembly 106 includes a touch sensitive screen (not shown) assembled over a liquid crystal display (LCD) module (not shown). Device 100 also includes a keypad 105, a 15 speaker opening 107, and a mast antenna 109. The device is powered by a battery 108. Although a cellular telephone is illustrated, those skilled in that art will recognize that the invention will also find application in two-way radios, pagers, personal organizers, PDAs, and the like, and "device" as used herein shall refer to each of these and their equivalents.

The back housing section 102 (FIG. 3) includes guide rails 302 and 306, and projecting arcuate members 304 and 305, creating a storage channel aligned with opening 103. The arcuate members 304 and 305 flex outwardly to engage the stylus when the stylus is inserted therebetween and press against the stylus to hold it within the housing. The back housing section 102 can be of any suitable manufacture, and is preferably integrally molded of a suitable material, such as an organic polymer.

The stylus 104 generally includes an elongate main shell 402 (FIG. 4), an elongate outer shell 404, a tip 406, a plunger 408, a finger 410, a spring 412, and a catch 414.

The main shell 402 is tubular and of any suitable manufacture, and may for example be constructed of a lightweight metal such as aluminum or an aluminum alloy. The main shell 402 is hollow, having aligned notches 403 and 405 on one end thereof. The main shell 402 can optionally include L-shaped hooks 437 and 439 integrally formed therewith The outer shell 404 is tubular and preferably of the same cross sectional shape, though slightly larger in cross-section dimension, as the main shell 402. The main shell can thus slide within the main shell when the stylus is extended and collapsed. The outer shell 404 is constructed of a lightweight metal material, such as aluminum or an aluminum alloy.

Figure 5:
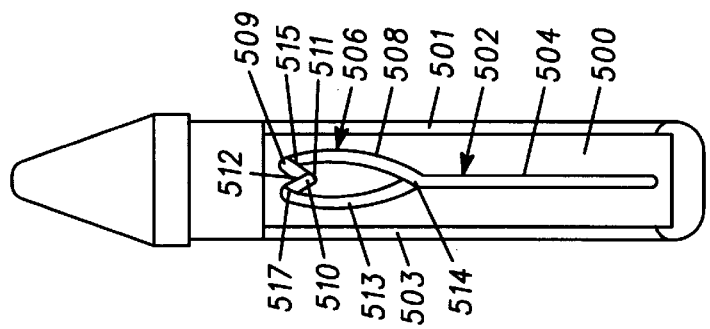
FIG. 5 is a front elevation view illustrating the tip of the stylus according to FIG. 4.

The tip 406 is manufactured of a suitable molded polymer, and preferably is compression fit within the end of main shell 402 opposite notches 403 and 405. The tip includes a planar surface 500 recessed from the top of the tip body. A track (FIG. 5) is recessed within surface 500. The track includes an elongate extension 504 and a one-way loop 506. The one-way loop 506 is generally heart shaped, including ramps 508, 509, 510 and 513. Ramp 508 slopes upwardly from the extension 504 to a step 515. Ramp 509 slopes upwardly from step 515 to step 512. Ramp 510 slopes upwardly from latch point 511 to a step 517. Ramp 513 slopes upwardly from the bottom of step 517 to the top of step 514. Each of the steps 512, 515, 517 and 514 is a step down from the top of one ramp to the lowest point in another ramp, creating a ledge to guide finger 410 therethrough in a desired direction, as described in greater detail hereinbelow.

The plunger 408 includes a projecting end 420 that receives finger 410. The projecting end is configured to fit between side walls 501 and 503 and against surface 500, whereby the projecting end 420 will slide between the side walls. The plunger has an outer end 422 of approximately the same size and shape as the outer dimension of the outer shell 404 such that their outer surfaces are flush. An intermediate section 424 is sized and dimensioned to compression fit within the outer shell 404 when the outer shell is slid into abutment with an inner edge of the outer end 422. The edge of the outer end 422 circumscribing the intermediate section is thus in juxtaposition with an end of the outer shell when the outer shell is assembled thereto.

The plunger 408 includes a channel 430 for receipt of catch 414. An anchor 432 is positioned at the end of channel 430 opposite intermediate section 424. The anchor 432 includes an opening 434 for receipt of a spring. A recess 436 on the bottom surface of the projecting end 420 receives finger 410. The plunger is of any suitable manufacture, such as integrally molded of an organic polymer.

In addition to the channel 430 that extends all of the way through the plunger, the plunger can optionally include recesses 433 and 435. The recesses are necessary when the optional hooks 437 and 439 are provided on the main shell 402. These optional L-shaped hooks 437 and 439 are pressed into the recesses 433 and 435 and freely slide therein when the stylus is retracted and extended. However, the hooks 437 and 439 will catch at the ends 441 and 443 when the stylus is fully extended to prevent the stylus from being pulled apart.

The finger 410 is mounted in the recess 436 of the plunger 408. The finger is resilient to permit it to follow the one-way track, or loop, 506 by bending while traveling therein while biased to return to a nonflexed, rest orientation. The finger 410 is preferably of any suitable construction, such as a stamped or extruded metal wire.

The spring 412 is small enough to fit easily within channel 430, such that it can move unimpeded therein. The spring includes a hook 438 at one end for insertion in opening 434. A hook 440 at the other end is for attachment to catch 414. The spring 412 is of any suitable manufacture, and is preferably a metal coil expansion spring.

The catch 414 is an elongated member shaped to fit within the channel 430. The outer ends extend beyond the channel for insertion into notches 403 and 405 when the main shell is assembled over the plunger. The outer edges 413, 415 of the catch will thus abut with, and catch, the main shell 402. The catch also includes an opening 444 for receipt of hook 440. The catch thus travels within the channel while the spring pulls the main shell away from the outer end 422 to fully extend the stylus.

To assemble the stylus, the finger 410 is attached to the recess 436 using a suitable means, such as heat staking, an adhesive, fasteners, or the like. Hook 440 is inserted into opening 444, and the spring 412 and catch 414 are inserted into channel 430. The hook 438 is then inserted into opening 434. The tip 406 is pressed into the main shell 402. The main shell 402 is then slid over the plunger until the hook at the end of finger 410 is inserted into the extension 504 and the catch 414 is received into notches 403 and 405. The shell is then attached over the plunger 408 and affixed to intermediate section 424 by press fitting or use of an adhesive. If one or more of the optional hooks 437 and 439 are employed, they will slide over the plunger surface when the main shell 402 is pushed onto the plunger 408.

The outer shell 404 slides over the main shell 402. The outer shell will push the optional hooks 437 and 439 into the recesses 433 and 435. These hooks have sufficient clearance between the sides of the recesses so that they will move freely. However, the hooked end will engage the ends 441 and 443 when the stylus is fully extended such that the stylus can not be pulled apart. The outer shell 404 is press fit over the intermediate section 424 to complete assembly of the stylus.

In operation, to retract the stylus 104, the outer end 422 is pressed toward tip 406. This causes the main shell 402 to slide deeper into outer shell 404. Retracting the stylus extends the spring 412 since the catch 414 abutting the end of main shell 402 is pushed away from the anchor 432. During retraction, the finger 410 slides along the extension 504 and then into ramp 508. The step 514 is higher than the extension, creating a ridge the guides the finger onto ramp 508 from extension 504. The finger then travels to the top of the heart following the ramp 508. Ramp 508 terminates at a step 515, which steps down to a ramp 509. The step 515 creates a ledge preventing finger 410 from sliding back into ramp 508. The finger then travels up ramp 509 over the step 512, pulled by spring 412 when the user releases the plunger.

The finger 410 is caught at the latch point 511. The stylus 104 collapses in this manner when it is pushed into the back housing section 102. The stylus will follow the guide rails 302, 306 into arcuate members 304 and 305 until the tip 406 contacts stop 309. The resilient arcuate members will press inwardly to hold the stylus in the back housing section 102, and the guide rails, having a generally L-shaped cross-section, hold the stylus against the inner surface 310 of back housing section 102. Additionally, the finger 410 rests in latch point 511 while the stylus is in the retracted position, firmly holding the stylus against extension The stylus is thus latched and securely held in back housing section 102 when stored.

When finger 410 is lodged in latch point 511, with the spring extended, the stylus abuts with stop 309 (FIG. 3). The stylus is collapsed to a length equal to the distance between stop 309 (FIG. 3) and the outer surface of the back housing section 102. The collapsed stylus thus fits within the area between the well 308 for battery 108 (shown in FIG. 2) and the opening 103 for the stylus. The outer surface 460 of the stylus is flush with the outer surface of the housing, and is contoured to match the curves of the rear housing section 102 around the opening 103, as best shown in FIG. 2.

To eject the stylus, the user presses outer surface 460. The finger 410 slides up ramp 510 over step 517. When the user releases the surface 460, the step 517 presents a ledge that guides the finger up ramp 513 and over step 514. The expansion spring, which is stretched at the top of loop 406, pulls the finger 410 to the remote end 448 of extension 504. The stylus is held at the fully extended position by the spring 412 pulling the finger 410 against end 448. The optional hooks 437 and 439 engaged with the ends 441 and 443, respectively, can be provided to help hold the stylus against further expansion and disassembly.

Figure 4:
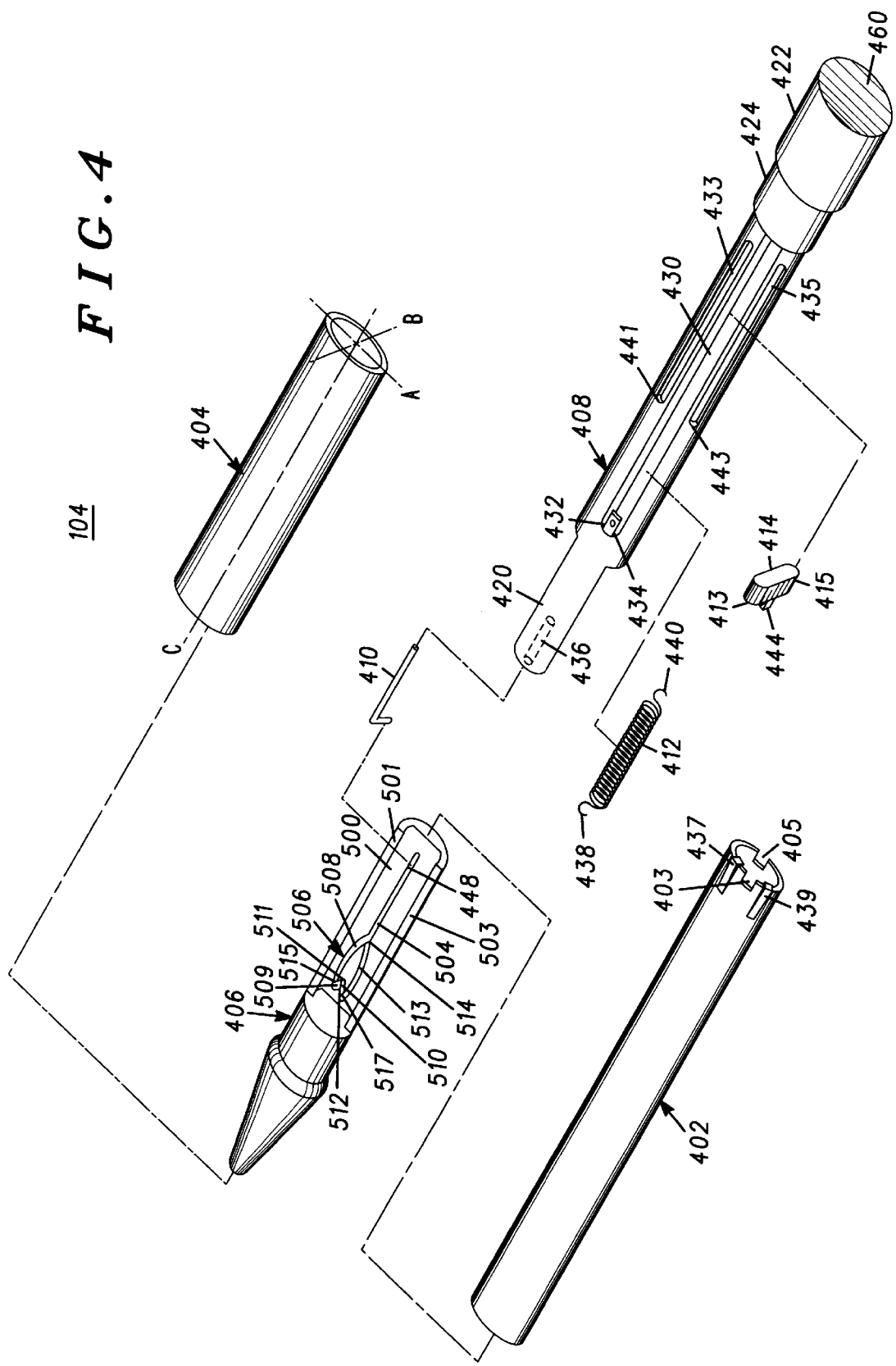
FIG. 4 is an enlarged exploded view of the stylus in FIG. 3.

While stored, as shown in FIG. 4, the plane through the widest axis A is parallel to the inner surface of back housing section 102. Thus, the plane with the smallest dimension, B, is orthogonal to the inner surface 310 of back housing section 102. The low profile eject stylus 104, held snugly against the back housing section 102, thus does not extend far from the inner surface 310, such that the stylus does not require a significant volume for storage within the device. In a reduction to practice, the width A (FIG. 7) is 8 millimeters and the thickness B (FIG. 7), along an axis orthogonal to A, is 5 millimeters. Of course other dimensions could be used. As illustrated in FIG. 4, dimensions A and B are both transverse to the longitudinal axis C.

Figure 7:
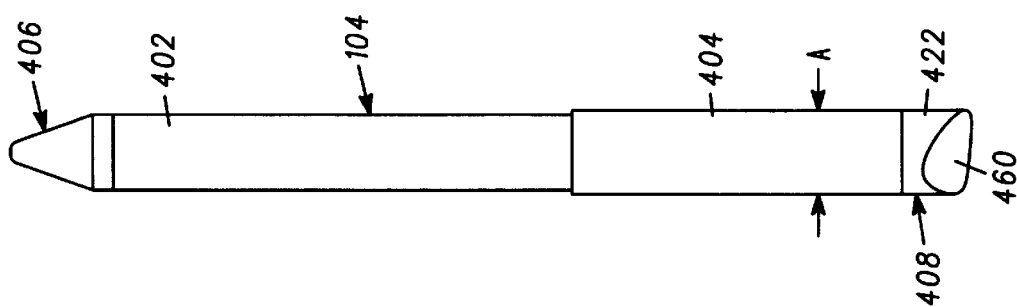
FIG. 7 is a front elevation view illustrating the stylus.
Figure 6:
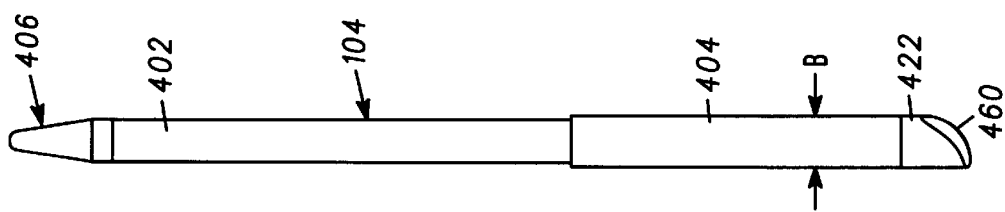
FIG. 6 is a side elevation view illustrating the stylus.

It is desirable that the smart phone illustrated for device 100 be no larger than a conventional radiotelephone so that users will be able to transport it, store it, and use it for extended periods of time without fatigue. The present stylus is light weight and can be accommodated in a small volume such that its storage does not add unnecessarily to the volume requirements of device 100. The present stylus is preferably wider than it is thick, allowing it to lie flat along the inner surface 310 of back housing section 102 when stored. The metal outer layer and inner members combine to present a stylus that is strong enough that it will not bend during use. The stylus can be elliptical (as illustrated) or rectangular in cross section, as long as its thickness (FIG. 6) is less than its width (FIG. 7). Additionally, the stylus is readily integrated into the back housing section 102 presenting a flush outer surface 460 which will not snag on clothes or other objects.

We claim:

1. A low profile eject stylus, comprising:
   a main shell;
   an outer shell, the main shell being smaller than the outer shell whereby the main shell can slide within the outer shell, the outer shell having a cross sectional configuration such that it is larger in one direction than it is in another direction orthogonal to the one direction whereby the eject stylus has a low profile;
   a tip, the tip to fit within the main shell and include a track on one surface thereof;
   a plunger, the outer shell assembled over at least a portion of the plunger;
   a finger, the finger mounted to the plunger and positioned in the track to slide therein when the eject stylus is collapsed and extended; and
   a spring coupled to the plunger to bias the eject stylus into a fully extended position.

2. The low profile eject stylus as defined in claim 1, wherein the main shell has orthogonal cross sectional dimensions that are different.

3. The low profile eject stylus as defined in claim 2, wherein the main and outer shells are tubular, and comprise a lightweight metal material having an elliptical cross-section.

4. The low profile eject stylus as defined in claim 1, wherein the track includes a one-way loop and an extension, the one-way loop having a plurality of ramps.

5. The low profile eject stylus as defined in claim 1, wherein the plunger includes an outer end abutting with an end of the outer shell.

6. The low profile eject stylus as defined in claim 1, wherein the spring comprises a coil expansion spring.

7. The low profile eject stylus as defined in claim 6, wherein the plunger includes an opening for receipt of a hook on the spring.

8. The low profile eject stylus as defined in claim 7, wherein the plunger includes a channel for receipt of the spring therein.

9. The low profile eject stylus as defined in claim 8, further including a catch positioned in the channel and having an outer edge and an inner opening, the inner opening to connect to an end of the spring, the catch to travel in the channel while the outer edge abuts with an end of the main shell.

10. The low profile eject stylus as defined in claim 1, wherein the plunger further includes at least one recess and the main shell includes at least one hook for insertion into the at least one recess to help hold the eject stylus together.

11. A portable communication device comprising:
    a housing having a body including an opening for receipt of a stylus;
    guide rails to guide the stylus in the housing; and
    a low profile eject stylus to be positioned in the housing, the low profile eject stylus including
    a main shell,
    an outer shell, the main shell being smaller than the outer shell whereby the main shell can slide within the outer shell, the outer shell having a cross sectional configuration such that it is larger in one direction than it is in another direction orthogonal to the one direction such that the eject stylus has a low profile,
    a tip, the tip to fit within the main shell at an end opposite to the outer shell,
    a plunger, the outer shell assembled over at least a portion of the plunger, and
    a spring coupled to the plunger to bias the eject stylus into a fully extended position.

12. The portable communication device as defined in claim 11, further including a finger carried on the plunger, wherein the tip includes a planar member having a track in which the finger travels to move the eject stylus between a collapsed position and an extended position.

13. The portable communication device as defined in claim 12, wherein the track includes a one-way loop and an extension, the extension setting an extended length of the eject stylus.

14. The portable communication device as defined in claim 13, wherein the one-way loop is heart shaped including a catch point that sets a collapsed length of the eject stylus.

15. The portable communication device as defined in claim 14, wherein the outer end of the eject stylus has a surface that is shaped flush with the outer surface of the housing, whereby the eject stylus when stored presents an end surface that is flush with the housing.

16. The portable communication device as defined in claim 11, wherein the housing further includes members aligned with the guide rails to engage the eject stylus and help hold it in the housing.

17. The portable communication device as defined in claim 16, further including a stop aligned with the opening and the guide rails, the eject stylus abutting with the stop to position the eject stylus such that an outer surface if the eject stylus is flush with the housing when the eject stylus is stowed therein.

18. The portable communication device as defined in claim 17, wherein the eject stylus includes an expansion spring that extends the eject stylus when the outer surface is pressed while the eject stylus is stowed.

* * * * *